March 17, 1936. R. J. LEVY 2,034,049
INDICATIVE APPARATUS FOR OBTAINING UNDISTORTED STEREOSCOPIC VIEWS
Filed Feb. 21, 1934 4 Sheets-Sheet 1
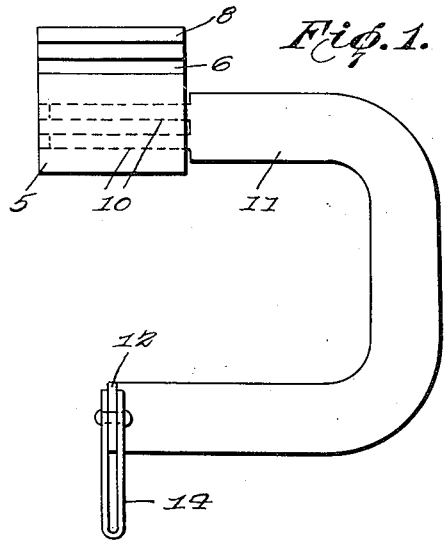
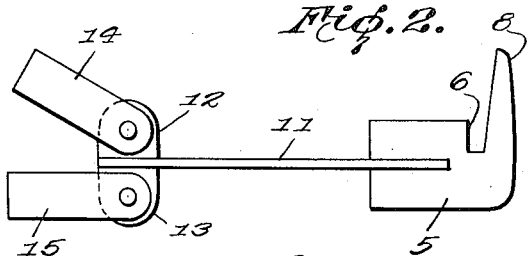
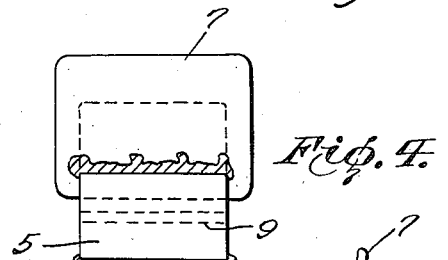
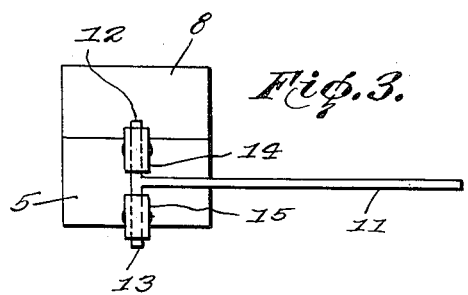
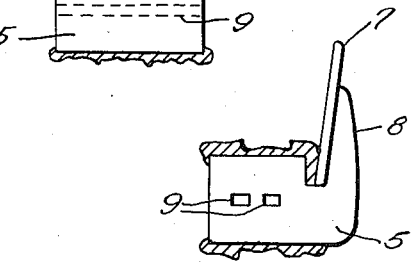
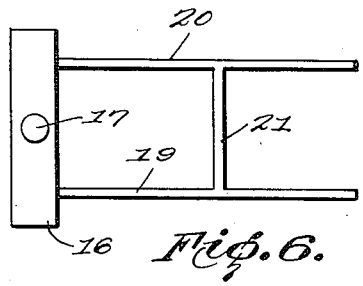
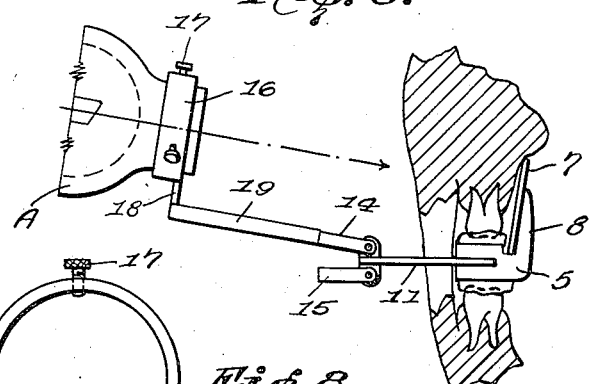
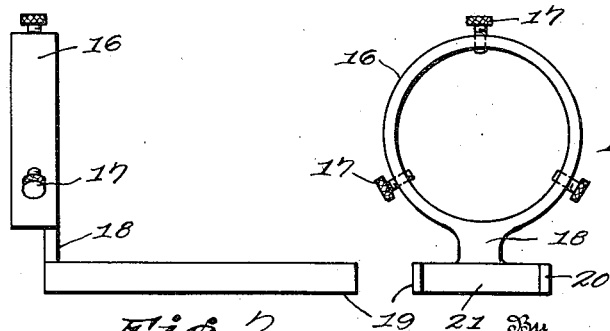
Inventor:
Roman J. Levy.
F. V. Winters.
Attorney March 17, 1936. R. J. LEVY 2,034,049
INDICATIVE APPARATUS FOR OBTAINING UNDISTORTED STEREOSCOPIC VIEWS
Filed Feb. 21, 1934 4 Sheets-Sheet 2
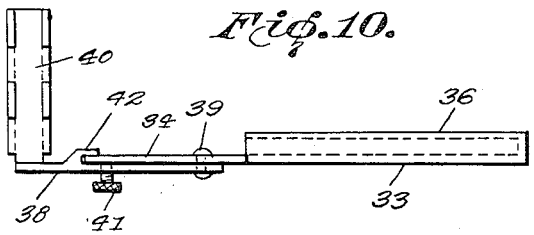
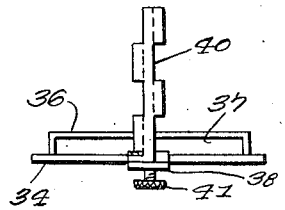
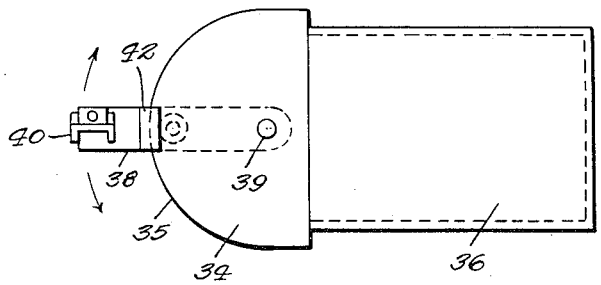
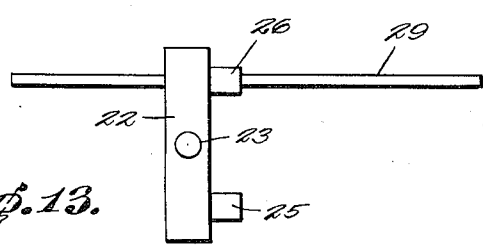
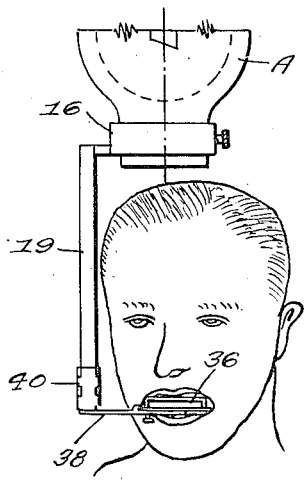
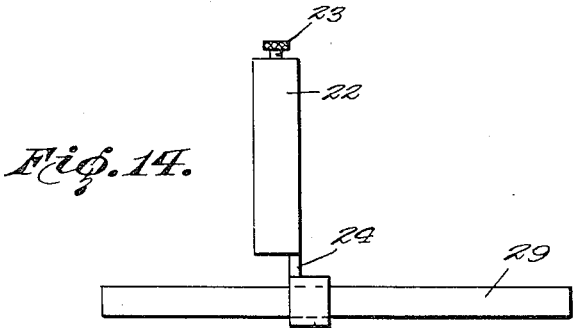
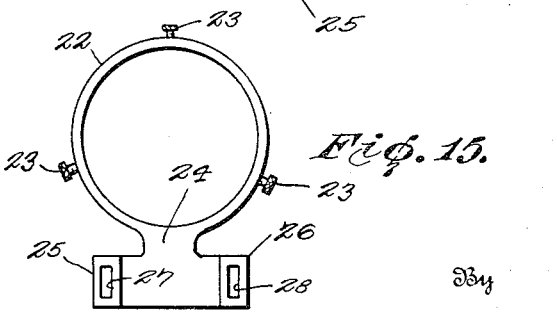
Inventor:
Roman J. Levy.
By F. V. Winters.
Attorney

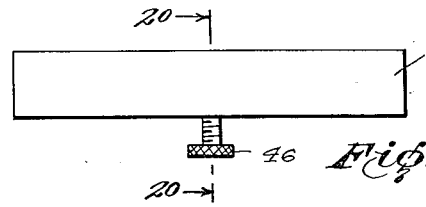
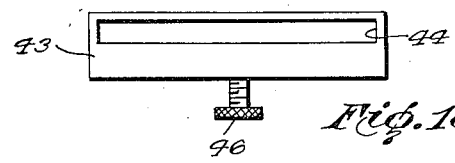
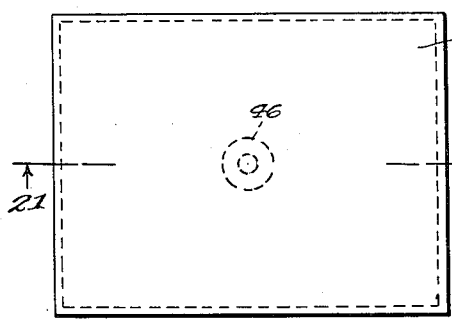
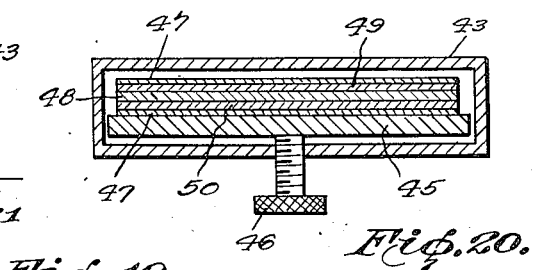
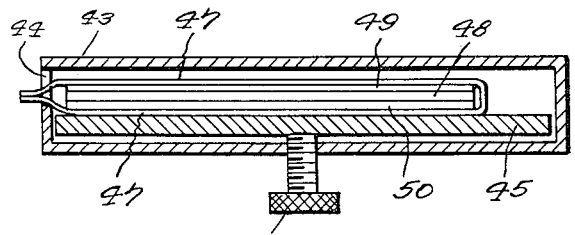
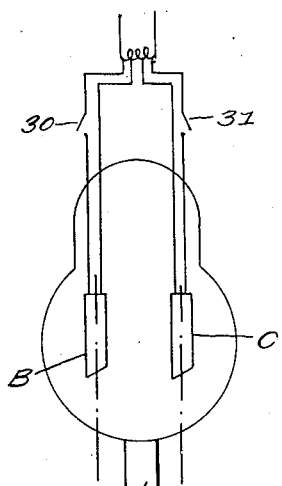
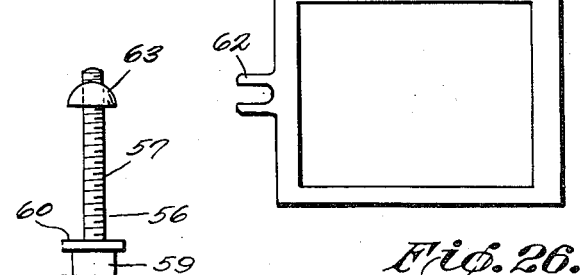

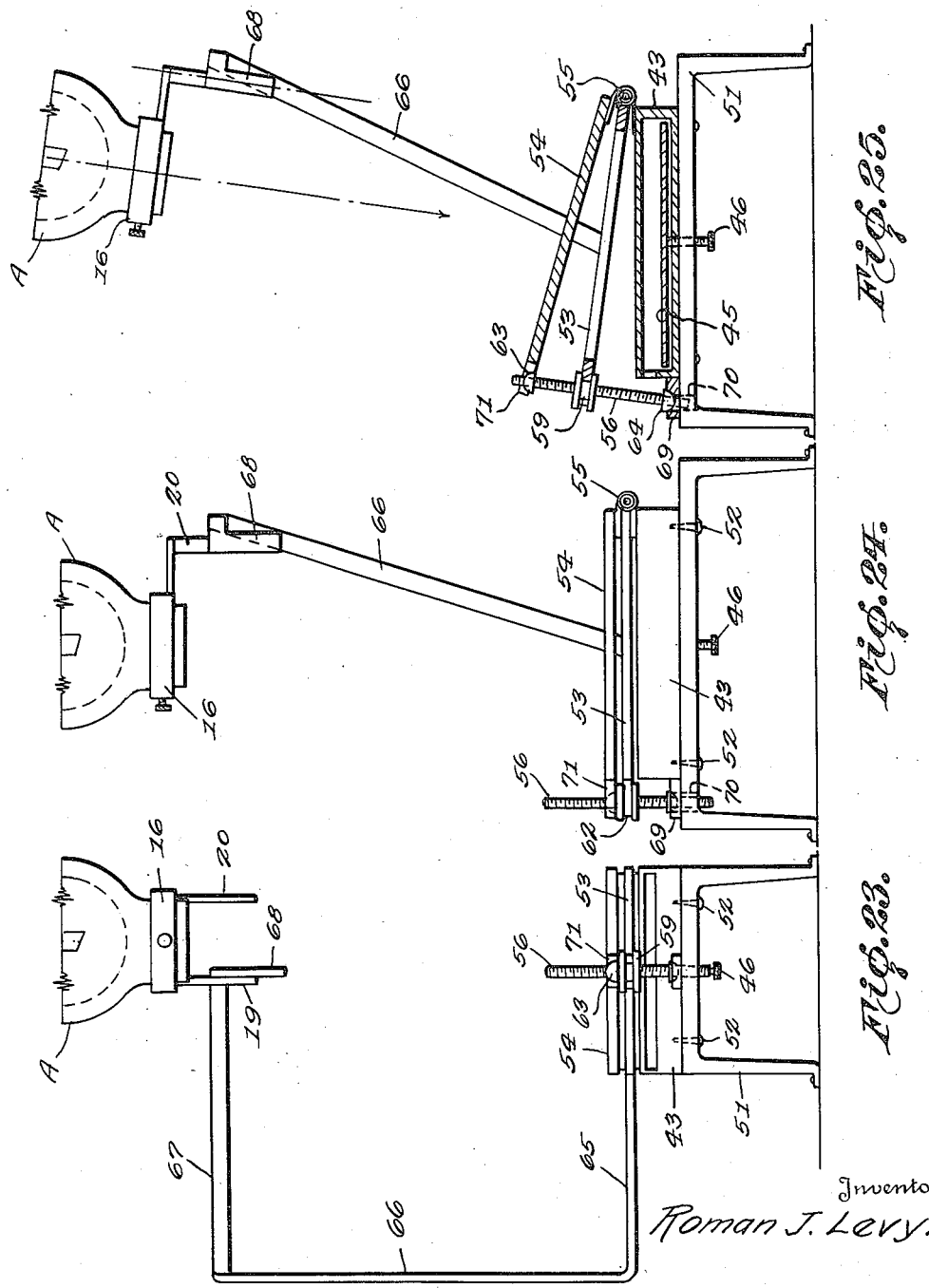

Patented Mar. 17, 1936

2,034,049

UNITED STATES PATENT OFFICE 2,034,049

INDICATIVE APPARATUS FOR OBTAINING UNDISTORTED STEREOSCOPIC VIEWS

Roman J. Levy, New York, N. Y.

Application February 21, 1934, Serial No. 712,417

7 Claims. (Cl. 250—34)

The subject-matter of the present invention relates generally to radiography and the improvements are directed to a novel and unique indicative apparatus for obtaining undistorted stereoscopic views.

The primary object of the invention resides in the provision of means for radiographic reproduction in which X-ray stereographs are produced so that true and accurate stereoscopic views are obtained.

As will presently appear the invention is featured by apparatus adapted for use in connection with intra-oral and extra-oral use, said apparatus being arranged to cooperate with an X-ray tube, such as the Coolidge type, for the production of stereoscopic radiographs for the purpose set forth.

Another object of the invention is to provide a plurality of shifts adapted to be attached to an X-ray tube, said shifts being stationary or adjustable, whereby said tube may be shifted the requisite interpupillary distance for producing successive exposures.

Still another object resides in the production of a novel film holder used in connection with intra-oral technic, said film holder being suitably supported within the oral cavity, said supporting means being provided with certain indicators and arranged to be swung in a plane vertical to the longitudinal axis of said film holder and in alinement with its central transverse axis.

A further object of the invention is to provide still another film holder also adapted for use in connection with intra-oral technic, said holder permitting the coverage of a greater area to be viewed and embodying certain indicating means subject to movement in an orbital path.

The invention is further featured by the provision of a film holder adapted for use in conjunction with extra-oral technic, said holder including a shiftable bottom adapted to carry the film and certain intensifying screens.

Still another aim of the invention is to provide means for positioning the object to be X-rayed at a proper angle to the ray traveling to the film in said film holder, said means including a bisecting frame and an inclined surface hingedly supported by said film holder and adapted to be moved in unison to the aforesaid proper angle.

A still further object is to provide an indicative arm carried by said bisecting plane frame and extending therefrom and being provided with certain indicating means cooperative with the shifts carried by the X-ray tube.

With the above objects in view and any others which may suggest themselves from the specification and claims to follow, a better understanding of the invention may be gained by reference to the accompanying drawings.

In said drawings:

Figure 1 is a plan view of a film holder and the means carrying the same.

Fig. 2 is a side elevation thereof, showing the pair of indicators borne by said carrying means.

Fig. 3 is a front elevation of the same.

Fig. 4 is a front elevation of the film holder removed from its supporting means and showing the film carried thereby.

Fig. 5 is a side elevation thereof.

Fig. 6 is a plan view of the stationary shift means adapted to be attached to an X-ray tube.

Fig. 7 is a side elevation thereof.

Fig. 8 is a front elevation of said shift means as viewed from the right of Fig. 7.

Fig. 9 is a view showing the said shift means attached to an X-ray tube and further illustrating its cooperation with certain indicator means borne by the film holder and its supporting means.

Fig. 10 is a side elevation of another form of film holder.

Fig. 11 is an end elevation thereof.

Fig. 12 is a plan view of said film holder.

Fig. 13 is a plan view of the adjustable shift means.

Fig. 14 is a side elevation thereof.

Fig. 15 is an elevation of said shift means as viewed from the right of Fig. 14.

Fig. 16 is a view illustrative of the use of said film holder in connection with shift means attached to an X-ray tube.

Fig. 17 is a side elevation of another form of film holder used in connection with extra-oral technic.

Fig. 18 is a front elevation thereof showing the film-receiving opening.

Fig. 19 is a plan view of said film holder.

Fig. 20 is a cross-section, slightly enlarged, and taken on the line 20—20 of Fig. 17.

Fig. 21 is another cross-sectional view, slightly enlarged, and taken on the line 21—21 of Fig. 19.

Fig. 22 is a view, somewhat diagrammatic, showing an X-ray tube embodying a pair of anodes and used in connection with an immovable tube shift of the Coolidge type.

Fig. 23 is a front elevation of the apparatus used in connection with extra-oral technic.

Fig. 24 is a side elevation of the same.

Fig. 25 is a view somewhat like unto Fig. 24 but showing the film holder in section and the bisecting angle frame and the supporting plane angularly disposed.

Fig. 26 is a plan view of the bisecting angle frame removed from the film holder shown in Fig. 25.

Fig. 27 is a view of certain threaded means for elevating and lowering said bisecting angle frame and said supporting plane with respect to said film holder.

Referring now more in detail to the accompanying drawings, wherein like characters of reference denote similar parts throughout the respective views, let 5 represent the film holder shown in Figs. 1 to 5, inclusive, said holder comprising a block, made of wood, or other suitable material and having a slot 6 leading in from the upper surface of said block, (see Fig. 2), for the reception of the film 7, the rear portion of said block presenting an upstanding portion 8 to serve as a rest for said film. As shown in Fig. 5, said block is provided with openings 9 for the reception of tongues 10, (see Fig. 1), of the arm 11, said arm being U-shaped as shown, the outer end thereof presenting oppositely directed ears 12 and 13 which pivotally carry the elements 14 and 15, respectively, said elements being termed indicators. These indicators may be moved on their pivots in a plane vertical to the longitudinal axis of said film holder and they are also arranged in alignment with the central transverse axis of said holder. In using said film holder a suitable amount of softened impression compound is placed on the top and bottom surfaces thereof, as shown in Figs. 4 and 5, and after the tongues 10 have been inserted in the openings 9, and the film 7 has been placed in the slot 6, said holder is placed within the patient's mouth to present the film at the rear of the teeth to be X-rayed, the patient biting into said compound as shown in Fig. 9. The U-shaped arm 11 positions the indicators 14 and 15 exteriorly of the cheek of the patient and the exposure is taken by means of the X-ray tube and its shift means, about to be described.

The shift means referred to hereinbefore is shown in Figs. 6 to 8 inclusive, and the same comprises an annular element 16, in the form of a collar, or the like, provided with a plurality of setscrews 17 whereby the same may be removably affixed to an X-ray tube A, a portion of the latter being shown in Fig. 9. Said collar 16 is provided, with a bracket 18 extending from a pair of flat members 19 and 20, the latter being joined by a cross member 21, (see Fig. 6). Said members 19 and 20 will be constructed of bakelite, or the like, to be transpassable for the rays from the tube A and their distance apart may be two-thirds or a full interpupillary distance, the distance, of course, being taken between the inner surfaces of each member. In using the shift, the collar is positioned onto the tube A, as shown in Fig. 9, and the latter is moved or inclined so that the member 19 contacts in plane and angular direction with the indicator 14, which, it will be recalled, is pivotally carried by ear 12 of said arm 11. In this position the first exposure is performed. It will also be remembered that the film holder 5, with its impression compound, has been placed in the mouth of the patient between the opposing teeth of both jaws and thus said compound receives distinct indentations from the contacted teeth. After the first exposure has been made, the film holder is removed, another film placed in the slot 6, and the film holder is then replaced in its exact previous position, whereupon the tube is shifted until the member 20 contacts the lifted indicator 14 and the other exposure is taken. Thus, a pair of X-ray negatives are produced by successively exposing two sensitized films to a source of X-rays, the source being shifted a certain distance between the successive exposures. This distance is equal to the distance between members 19 and 20 which constitute the indicative means.

The shift means just described is termed stationary shift, but in addition to this arrangement I propose to provide an adjustable shift which is shown in detail in Figs. 13 to 15 of the drawings, wherein it will be noted the annular element 22 is provided with setscrews 23 to removably position the same on an X-ray tube, the bracket 24 depending from said element 22 and supporting a pair of spaced socket elements 25 and 26 having openings 27 and 28, respectively, whose central axes are parallely disposed, and arranged on the full interpupillary distance apart or two-thirds of the full interpupillary distance apart. One or two removably fitted rods, such as rod 29, shown in Fig. 13, being receivable within said openings 27 and 28, as desired. As mentioned above this shift means is adjustable and is used on irregular surfaces.

Another modification in the shift means is shown in Fig. 22, this type being termed the immovable X-ray tube shift, in that the anodes B and C are set apart the full or partial interpupillary distance and adapted to be alternately energized, this operation being effected by switches 30 and 31 in the conductors leading to the transformer, as shown. This arrangement eliminates shifting of the tube. Said tube is provided with a lug 32 for the reception of a flat bar to serve as an indicator to contact the indicators of a film holder.

The film holder shown in Figs. 10 to 12, inclusive, is used in intra-oral technic and comprises a bottom plate 33 having an extension 34 presenting an arcuately shaped edge 35, (see Fig. 12). A casing 36 is carried by said plate, said casing being closed at its sides, end and top, but presenting an open end 37, adjacent said extension 34 for the reception of a film packet. Said casing is transpassable for the rays of the tube and in view of the provision of the opening 37 the film may be readily placed into and removed from said casing as desired. As shown in Figs. 10 and 12, an arm 38 is pivotally carried by said extension 34, as indicated at 39, the outer end of said arm 38 carrying an indicator 40. Thus, the arm and indicator may be swung on its pivot 39 as indicated by the arrows in Fig. 12. After the film packet has been placed in the casing 36, the film holder is inserted in the patient's mouth in a horizontal position and the patient is instructed to bite thereon. The arm and indicator are now moved to the desired position and secured in this position by tightening the thumbscrew 41 thus clamping the detent 42 to the rim of said extension 34. The X-ray tube A and its attached shift means are now moved to bring the member 19 in contact with said indicator 40, (see Fig. 16), and the first exposure is made. The X-ray tube is now shifted until the number 20 contacts said indicator and the second exposure may be made.

The film holder shown in Figs. 17 to 21 comprises a casing 43 having an end opening 44 for the reception of the film packet, (see Figs. 18 and 21), the top of said casing being transpassable for the rays of an X-ray tube. Within said casing is positioned a platform 45, which is adapted to be elevated or lowered by means of the screw 46 threaded mounted in the bottom of said casing, as shown in Figs. 20 and 21. It will be understood that when the film packet is placed into said casing, by way of opening 44, said platform will be in the position shown in Fig. 21 and as the screw 46 is manipulated, said platform will be elevated to the desired position. This is a feature of some importance in that the film packet comprises a light-proof wrapping 47, a light sensitized film 48, and a pair of intensifying screens 49 and 50 positioned above and below said film 48, and it is essential that said intensifying screens be compressed with the film to overcome the long time exposure. Thus, it will be seen that the elevation of the platform 45 effects the aforesaid compression to obviate a defect in the present day apparatus.

In the use of the aforesaid film holder it is proposed to mount the same onto a table-like structure 51 by means of fasteners 52, (see Figs. 23 and 24), said film holder being associated with other structures, (as will be presently pointed out in detail), whereby extra-oral technic may be indulged in.

This extra-oral apparatus is especially adapted for use in taking stereoscopic views of different sinuses of the skull, in particular, the mouth cavity. The film is placed outwardly and the X-ray tube casts its ray through the skull from the opposite side. The rays are cast slantingly to the film and form an acute or obtuse angle with the light sensitized surface and are directed through the neck and the mouth cavity of the patient to avoid superposed images of the wouldbe encountering bony structures. The apparatus is provided with means for overcoming distortions and places the head of the patient and the light sensitized surface in such an angular position that rays traveling to the film will produce a right angle with relation to a bisecting angle frame, of the angle planes of the film and the objection. (The law for equivalent shadows.)

On reference to Figs. 23 to 25, inclusive, it will be noted that a bisecting angle frame 53 and a supporting plate 54 are hingedly connected to said film holder casing 43, and to each other, by means of a three-leaf hinge 55 and in view of this arrangement it is possible to elevate and lower said frame and plate (see Fig. 25) as desired, by means about to be described. Said movements are effected by means of an elongated screw 56, (see Fig. 27), the same being provided with right- and left-hand threads, 57 and 58 and an annular member 59 positioned centrally of said screw, said member having circumferential flanges 60 and 61 to support the notched extension 62 of said frame 53 therebetween, (see Figs. 26 and 25). The outer ends of said screw are provided with threaded nuts 63 and 64.

Upon inspection of Figs. 24 and 26 it will be noted that said frame 53 is provided with an arm 65 which extends laterally therefrom, said arm being bent to form the portions 66 and 67, (see Fig. 23), whilst the outer end of said portion 67 is bent to form an indicator 68, and this element is adapted to be contacted by the indicative means of the shift means during the taking of the exposure. The aforementioned nut 64 of said screw 57, (see Fig. 25), is mounted in a block 69, the latter being apertured at 70 to receive one end of said screw. The other nut 63 is mounted in a notched projection 71 of said supporting plate 54, both being swivelled in their respective connections but being held against rotation. Thus, when the annular element 59 is rotated the bisecting angle frame 53 and the supporting plate 54 are elevated in unison to the desired angle. In all positions, said frame 53 bisects the angle between said supporting plate and said film holder.

In the operation of the extra-oral device said screw 56 is manipulated until the required angle is obtained and in doing so, the indicators will always bring the rays automatically to exactly the same and nearest approach to the central region, as shown in Fig. 25. After the film packet has been placed in the casing 43 the screw 46 is manipulated to elevate the platform 45 causing the compression of the film. The head of the patient is laid on the supporting plate 54 and moved until the indicator 68 is directed properly to the pre-determined region.

In connection with this extra-oral device it is pointed out that in reference to superpositions and distortions that if the head of the patient is resting flat on the film holder, the ray will be cast in a rectangular direction to the light sensitized surface and will be free of distortions, but due to the fact of the abundance of bony structures in the skull, there will be quite a number of superpositions. To eliminate said superpositions, the ray must be cast through regions either empty or filled with soft tissues, which would not cast strong shadows to obscure the radiographic field. The ray must pass through the mouth and neck. The oral cavity is directly connected with the principal sinuses of the head and in easy communication with the rest of them, but the casting of the ray through the skull and through the neck and cavern oris on the film lying not directly beneath the spot it touches, the ray in entering the body will result in a position producing an acute angle between the film and the ray; the size of this angle, of course, will vary for different cases. Due to the fact that the X-ray produces shadow images a slanting ray will create distortions and the head of the patient cannot be directly on the film or parallel to it, but the same must be on an angular plane toward the film and the ray cast perpendicularly to the bisecting plane of said angle. To eliminate distortions and superpositions, the aforedescribed bisecting angle frame and the supporting plate are provided and it will be observed that the basis of the angle is created by the left- and right-hand threaded screw 56, and the head of the patient rests on said supporting plate with the neck approximating the base of the angle. The head is then turned as to deflect the central ray to the neck.

I claim:

1. An apparatus for producing a pair of stereoscopic radiographic views by a co-ordinated lateral displacement of an X-ray tube toward a light sensitized film, said apparatus comprising indicative means borne by said X-ray tube and embodying a pair of straight flat members separated by an interpupillary distance on the tube, a film holder, supporting means for said film holder and an indicator adjustably carried by said supporting means and adapted to be contacted by said indicative means associated with said tube.

2. An apparatus for producing a pair of stereoscopic radiographic views by a co-ordinated lateral displacement of an X-ray tube toward a light sensitized film, said apparatus comprising indicative means mounted on the X-ray tube and embodying a pair of parallel flat members separated from each other by the interpupillary distance, a film holder and a pair of indicators carried by said film holder and adapted to be contacted by the indicative means of said tube.

3. An apparatus for producing a pair of radiographic stereoscopic views by a co-ordinated lateral displacement of an X-ray tube toward a light sensitized film, said apparatus comprising indicative means mounted on said tube and embodying a pair of flat elements parallelly disposed with respect to each other and being separated by an interpupillary distance, a film holder, and indicator means associated with said holder and adapted to be contacted by the indicative means carried by said tube.

4. In combination with an X-ray tube including indicative means, of a film holder adapted to be placed in a patient's mouth, said holder having a slot to support a film, a U-shaped arm removably attached to said film holder and an indicator pivotally carried by one end of said film holder arm and being movable in a vertical plane aligned with the central transverse axis of said film holder.

5. In combination with a film holder having a slot to support a light sensitized film packet, of a U-shaped arm having one end supporting said film holder, and a pair of indicators pivotally borne by the other end of said arm, each of said indicators being movable, optionally, in a vertical plane aligned with the central transverse axis of said film holder.

6. Apparatus for supporting a film holder comprising a block adapted to be placed in the mouth of a patient, said block having a slot to support a film and being provided with a plurality of longitudinally disposed openings, a U-shaped arm having projections insertable within said openings, and an indicator pivotally carried by the other end of said arm, said indicator being shiftable in a vertical plane.

7. In combination with an X-ray tube having indicative means, of a supported film holder adapted to receive a film packet, a bisecting angle frame pivotally borne by said film holder, a supporting plate hinged to said frame, means for elevating said bisecting angle frame and supporting plate in unison to position the same at a pre-determined angle, an arm attached to said angle frame and an indicator carried by said arm and adapted to be contacted by the indicative means of said X-ray tube.

ROMAN J. LEVY.